G. Cooper,
Turning Regular Forms.

Nº 22,107. Patented Nov. 30, 1858.

Witnesses:
G. Yorke Able
H. H. Young

Inventor.
G. Cooper

UNITED STATES PATENT OFFICE.

GEORGE COOPER, OF BERLIN, WISCONSIN.

ARRANGEMENT OF CUTTERS FOR TURNING HUBS.

Specification of Letters Patent No. 22,167, dated November 30, 1858.

*To all whom it may concern:*

Be it known that I, GEORGE COOPER, of Berlin, in the county of Green Lake and State of Wisconsin, have invented a new and useful Improvement in Carriage-Hub-Turning Machines; and I do hereby declare that the following is a full, clear, and exact description of the same, reference being had to the accompanying drawings, forming a part of this specification, in which—

Figure 1:
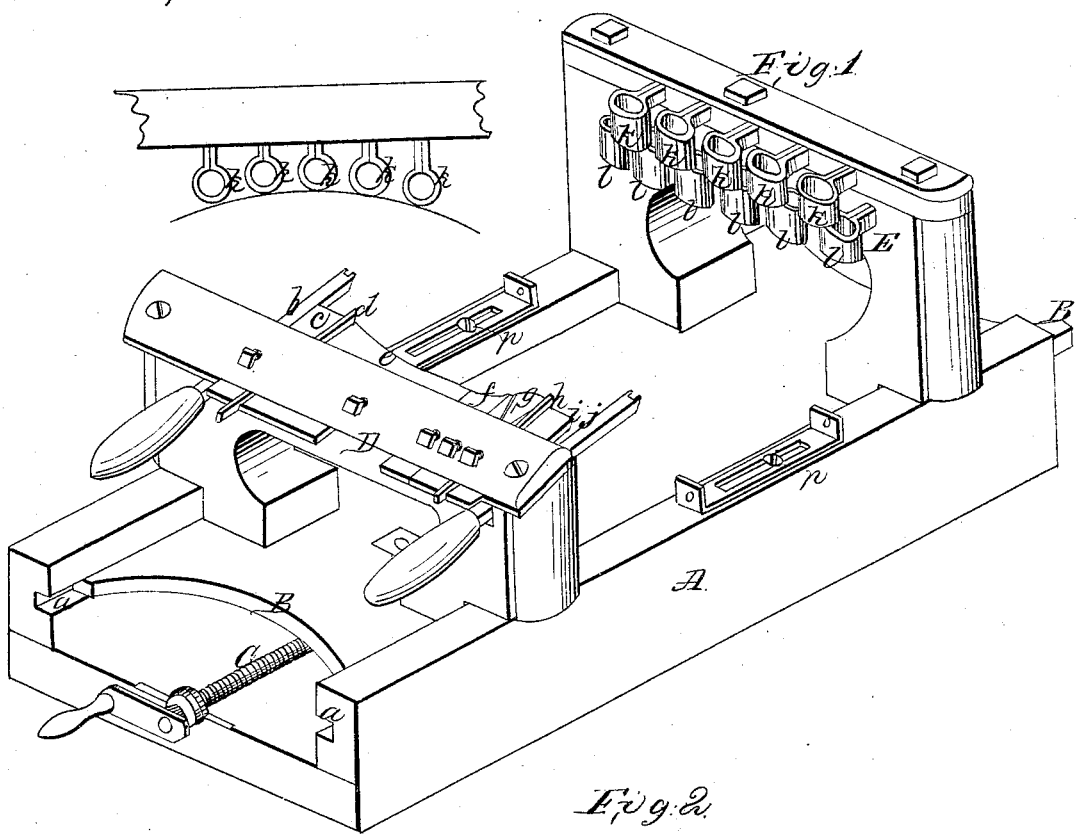
Figure 2:
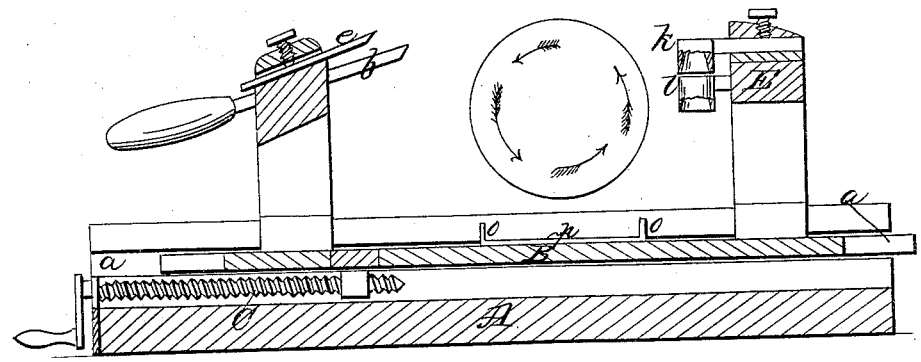

Figure 1 is a perspective view of a machine for turning carriage hubs, constructed after my invention. Fig. 2, is a vertical longitudinal section of the same. Fig. 3, is a plan or top view.

Similar letters of reference in each of the several figures indicate corresponding parts.

The improvement which I have made is designed for use in connection with a common centering lathe, and the cutters stand opposite the space existing between the two cone centers of such lathe, and thus, when the hub block is placed in said space on the centers, the cutters, by being adjusted, can be brought into operation so as to reduce and give the block the shape of a hub.

The nature of my invention consists in the arrangement of a preparatory cutter stock, set with a series of edge cutters, and a main cutter stock set with a finishing cutter, made in one piece or in sections, in the same machine, in such a manner and in such relation to each other that when the cutters of the preparatory cutting stock are brought into action the cutters of the main cutter stock are thrown out of operative position, and vice versa. By thus employing two sliding cutter stocks, the hub block can be shaped and reduced in the rough to a form approximately to a hub, and thus be prepared for the shaping and finishing cutters, which are light and sharp and would not be able to alone perform the turning out of the hub without soon becoming dulled or impaired.

To enable others skilled in the art to make and use my invention, I will proceed to describe its construction and operation.

A, represents a stationary bed bolted to the top of the lathe so that the centers of the lathe shall stand at right angles to its side edges. This bed has a sliding plate B, fitted to it by means of grooves $a$, $a$, and an adjusting screw C, as shown. On the front end of this sliding plate is arranged the main cutter stock D, and on the rear end the preparatory cutter stock E. The main cutter may carry a sectional cutter $b$, $c$, $d$, $e$, $f$, $g$, $h$, $i$, $j$, and the preparatory cutter stock may carry cylindrical cutters $k$, $l$, as shown. The sections of the preparatory and main cutters above named are confined in place by set screws $m$, $n$, and can be adjusted so as to cut any desired depth of molding on the hub. The preparatory cutter serves for cutting the hub block to the desired shape, in the rough, while the main cutter serves for giving the finish to the hub. The cylindrical sections forming the preparatory cutter being set in a line approximating in shape to the outline of the hub, as illustrated in Fig. 3, and the sections forming the main cutter being set and shaped so as to follow in the tracks formed by the preparatory cutter on the hub block, and to give the proper shape and finish to the hub, and perfectly form the moldings thereon. The end sections $b$, $j$, of the main cutter may be set so as to trim off the ends of the hub during the cutting of the moldings on the circumference, or they may be brought into operation subsequently or after the moldings have been finished.

$o$, $o$, are adjustable gages or stops for regulating the extent of the movement of the cutter stocks. These gages can be set by means of the set screws $p$, $p$, so as to allow of the cutter stocks being adjusted to suit varying diameters of hubs.

In the drawing I have represented two preparatory cutters $k$, $l$, the sections thereof being set so that those of the upper cutter shall stand over the spaces between those of the lower cutter. By this arrangement the whole surface or outline of the hub in the rough will be cut and prepared for the action of the main cutter without the necessity of using a cutter formed of one unbroken piece, and thus the work will be performed more easily and with less strain on the cutters, as small pieces or chips, instead of one large chip, will be removed as the hub rotates.

Instead of using two preparatory cutters, I think it will be found advantageous and cheaper to so shape the sections of the preparatory cutter that the same result may be accomplished by a single sectional preparatory cutter as is accomplished by two. Or in practice a single preparatory cutter formed of a series of gouges of proper shape may be found adequate to the work to be performed. This, however, will be better arrived at by experiment and as my claim does not rest on any particular form or arrangement of preparatory cutter, but on the combination of main and preparatory cutter stocks, further description on this point is deemed unnecessary.

In the drawing I have shown a screw C, for moving the preparatory and main cutters up to and from the hub block, but in practice it may be found advantageous to use a cord, pulley, weight and lever for accomplishing this operation; or it might answer a good purpose to divide the plate B, and employ a right and left screw so that the cutters shall be moved apart independently of one another.

In using my improvement the hub block is centered in the lathe and the preparatory cutters brought up in contact with the block and the main cutters forced back out of the way of the same by turning the screw C, until the cutter stock E, strikes the guide or stop O. This being done the hub block is revolved in the lathe, as indicated by the arrows, against the preparatory cutter or cutters until it has, in the rough, the outline of the desired hub cut upon it. The preparatory cutters are now moved back and the main cutters brought forward by turning the screw C, in an opposite direction. All being properly adjusted the hub block is revolved against the main cutters in the direction of the arrows and in its revolution is turned and finished on its surface and trimmed on its ends.

With this machine one man can turn out about four hundred hubs per day or three hundred and sixty more than he can make by hand in the same time.

What I claim as my invention and desire to secure by Letters Patent, is—

The arrangement in the same machine of the adjustable preparatory and main cutter stock D, E, furnished with suitable cutters, in combination with any ordinary turning lathe or revolving centering shaft, substantially as and for the purposes set forth.

GEOR. COOPER.

Witnesses:
G. YORKE AT LEE,
H. H. YOUNG.